(12) United States Patent
Beard et al.

(10) Patent No.: US 7,848,703 B1
(45) Date of Patent: Dec. 7, 2010

(54) METHOD AND APPARATUS FOR BINDING WIRELESS DEVICES

(75) Inventors: Paul Beard, Milpitas, CA (US); Ryan Winfield Woodings, Boise, ID (US)

(73) Assignee: Cypress Semiconductor Corporation, San Jose, CA (US)

( * ) Notice: Subject to any disclaimer, the term of this patent is extended or adjusted under 35 U.S.C. 154(b) by 469 days.

(21) Appl. No.: 11/027,005

(22) Filed: Dec. 30, 2004

(51) Int. Cl.
*H04B 7/00* (2006.01)

(52) U.S. Cl. ................ 455/41.2; 455/39; 455/522; 455/420; 455/410; 455/422.1; 455/461; 455/465; 455/411; 455/566; 380/247; 380/270; 713/168; 713/151; 713/2; 725/35; 340/573.1

(58) Field of Classification Search ........... 455/41.2, 455/39, 522, 420, 410, 422.1, 461, 465, 411, 455/566; 380/247, 270; 713/168, 151, 2; 342/357.09; 725/35; 340/573.1
See application file for complete search history.

(56) References Cited

U.S. PATENT DOCUMENTS

| | | | |
|---|---|---|---|
| 5,680,102 A | 10/1997 | Xydis | |
| 5,900,806 A | 5/1999 | Issa et al. | |
| 5,955,700 A | 9/1999 | Slipy et al. | |
| 6,238,338 B1 | 5/2001 | DeLuca et al. | |
| 6,615,301 B1 | 9/2003 | Lee et al. | |
| 6,690,056 B1 | 2/2004 | Reedy et al. | |
| 6,708,288 B1 | 3/2004 | Ziegler et al. | 714/15 |
| 6,741,178 B1 | 5/2004 | Tuttle | |
| 6,765,363 B2 | 7/2004 | LaFollette et al. | |
| 6,956,480 B2 | 10/2005 | Jespersen | |
| 6,961,541 B2 * | 11/2005 | Overy et al. | 455/41.2 |
| 6,970,183 B1 | 11/2005 | Monroe | |
| 7,026,983 B2 * | 4/2006 | Spratt | 342/357.09 |
| 7,072,615 B1 * | 7/2006 | Todd | 455/41.2 |
| 7,142,814 B2 * | 11/2006 | Nassimi | 455/41.2 |
| 7,174,130 B2 * | 2/2007 | Kurisko et al. | 455/41.2 |
| 7,209,705 B2 * | 4/2007 | Moles et al. | 455/41.2 |
| 2001/0049740 A1 | 12/2001 | Karpoff | |
| 2003/0006737 A1 | 1/2003 | LaFollette et al. | |
| 2003/0063003 A1 * | 4/2003 | Bero et al. | 340/573.1 |
| 2003/0073461 A1 | 4/2003 | Sinclair | |
| 2003/0138941 A1 | 7/2003 | Gong et al. | |
| 2003/0151600 A1 | 8/2003 | Takeuchi et al. | |
| 2003/0178395 A1 | 9/2003 | Duignan | |

(Continued)

OTHER PUBLICATIONS

USPTO Non-Final Rejection for U.S. Appl. No. 10/859,675 dated Nov. 19, 2007; 7 pages.

(Continued)

*Primary Examiner*—Matthew D Anderson
*Assistant Examiner*—April G Gonzales

(57) ABSTRACT

When wireless binding or pairing is required, two wireless devices change from a normal broad wireless operating range to a reduced wireless operating range. The wireless devices then conduct binding or pairing operations in the reduced wireless range. This prevents other wireless devices in the same area from detecting the same reduced range binding signaling and inadvertently binding with the wrong devices. After the reduced range binding operations are completed, the wireless devices automatically switch back to the broader normal wireless operating range and use the exchanged binding information for conducting normal wireless communications. The reduced range pairing scheme creates a simple and intuitive technique for pairing wireless devices without requiring the user to press buttons or select devices from a list.

19 Claims, 6 Drawing Sheets

U.S. PATENT DOCUMENTS

| | | |
|---|---|---|
| 2003/0190906 A1 | 10/2003 | Winick |
| 2004/0107435 A1* | 6/2004 | Anzai et al. .................... 725/35 |
| 2004/0130446 A1 | 7/2004 | Chen et al. |
| 2004/0139110 A1 | 7/2004 | LaMarca et al. |
| 2004/0176032 A1* | 9/2004 | Kotola et al. ................ 455/41.2 |
| 2005/0048919 A1* | 3/2005 | Jeannerod .................. 455/41.2 |
| 2005/0064814 A1* | 3/2005 | Matsuo et al. ............. 455/41.1 |
| 2005/0266798 A1* | 12/2005 | Moloney et al. ........... 455/41.2 |
| 2005/0282588 A1* | 12/2005 | Linjama et al. ............. 455/566 |
| 2005/0287950 A1* | 12/2005 | Helden et al. .............. 455/41.2 |
| 2006/0035590 A1* | 2/2006 | Morris et al. .............. 455/41.2 |
| 2006/0053276 A1* | 3/2006 | Lortz et al. .................... 713/2 |
| 2006/0105712 A1* | 5/2006 | Glass et al. ................ 455/41.2 |
| 2006/0149963 A1* | 7/2006 | Lu et al. ..................... 713/151 |
| 2006/0183462 A1* | 8/2006 | Kolehmainen .............. 455/411 |
| 2006/0199536 A1* | 9/2006 | Eisenbach .................. 455/41.2 |
| 2006/0234630 A1* | 10/2006 | Lai ........................... 455/41.2 |
| 2007/0093207 A1* | 4/2007 | Kim ........................... 455/41.2 |

OTHER PUBLICATIONS

USPTO Requirement for Restriction/Election for U.S. Appl. No. 10/859,675 dated Apr. 19, 2007; 6 pages.
USPTO Advisory Action for U.S. Appl. No. 10/859,675 dated Jan. 12, 2007; 3 pages.
USPTO Final Rejection for U.S. Appl. No. 10/859,675 dated Nov. 2, 2006; 8 pages.
USPTO Non-Final Rejection for U.S. Appl. No. 10/859,675 dated Jul. 12, 2006; 8 pages.
U.S. Appl. No. 12/239,602: "Wireless Communication Device and Method," Beard et al., filed on Sep. 26, 2008; 33 pages.
USPTO Final Rejection for U.S. Appl. No. 10/859,675 dated May 26, 2009; 7 pages.
USPTO Requirement Restriction for U.S. Appl. No. 10/859,675 dated Sep. 6, 2007; 3 pages.

* cited by examiner

BINDING MODE

METHOD AND APPARATUS FOR BINDING WIRELESS DEVICES

BACKGROUND

Wired peripherals, such as keyboards, mice, game controllers, etc. are physically connected to a host computer by a cable. Wireless peripherals on the other hand are not physically connected to the host computer. Therefore wireless peripherals must be paired to the host to create a "virtual cable." During the "pairing" or "binding" process, two wireless devices exchange device identifiers (IDs) and agree upon one of multiple wireless channels for transmitting information. The device IDs are sent along with the wireless transmissions so that the receiving device can confirm it is receiving data from the correct remote wireless device.

Today there are three main techniques for wirelessly pairing a peripheral with a desired host. The first technique requires a user to push buttons on the peripheral and host at the same time. This places both devices in a special pairing mode where the two devices exchange pairing information. The pairing button technique assumes that no other devices will be in the pairing mode at the same time. This is the typical technique used with most 27 Mega Hertz (MHz) wireless mice and keyboards.

The pairing buttons used for the pairing button technique add cost to the host and peripheral devices. The pairing buttons are usually placed in out of the way locations on the wireless devices and are relatively small so they are not accidentally pressed during normal wireless operations. Users are frustrated when they cannot find or activate these small out of the way pairing buttons.

A second pairing technique requires the wireless peripheral device to query all devices in range and present a list to the user. The peripheral user then selects the desired host from the displayed list. The list technique requires a user interface, which is not available on many low-cost peripheral devices. This technique also requires the user to know the name, or some other distinguishing characteristic, of the desired host in order to select it from the list of all in-range devices.

A third wireless system adds a near field communications transceiver to each wireless device that only transmits over a few centimeters. This technique requires additional transceiver hardware and additional firmware to control the special near field communications transceiver. The near field transceiver uses special wireless binding signals that are different from the signaling used for normal data communications. This adds additional wireless hardware to the system that is cost-prohibitive for many low-cost peripherals.

The present invention addresses this and other problems associated with the prior art.

SUMMARY OF THE INVENTION

When wireless binding or pairing is required, two wireless devices change from a normal broad wireless operating range to a reduced wireless operating range. The wireless devices then conduct binding or pairing operations in the reduced wireless range. This prevents other wireless devices in the same area from detecting the same reduced range binding signaling and inadvertently binding with the wrong devices. After the reduced range binding operations are completed, the wireless devices automatically switch back to the broader normal wireless operating range and use the exchanged binding information for conducting normal wireless communications. The reduced range pairing scheme creates a simple and intuitive technique for pairing wireless devices without requiring the user to press buttons or select devices from a list.

The foregoing and other objects, features and advantages of the invention will become more readily apparent from the following detailed description of a preferred embodiment of the invention which proceeds with reference to the accompanying drawings.

DETAILED DESCRIPTION

Figure 1:
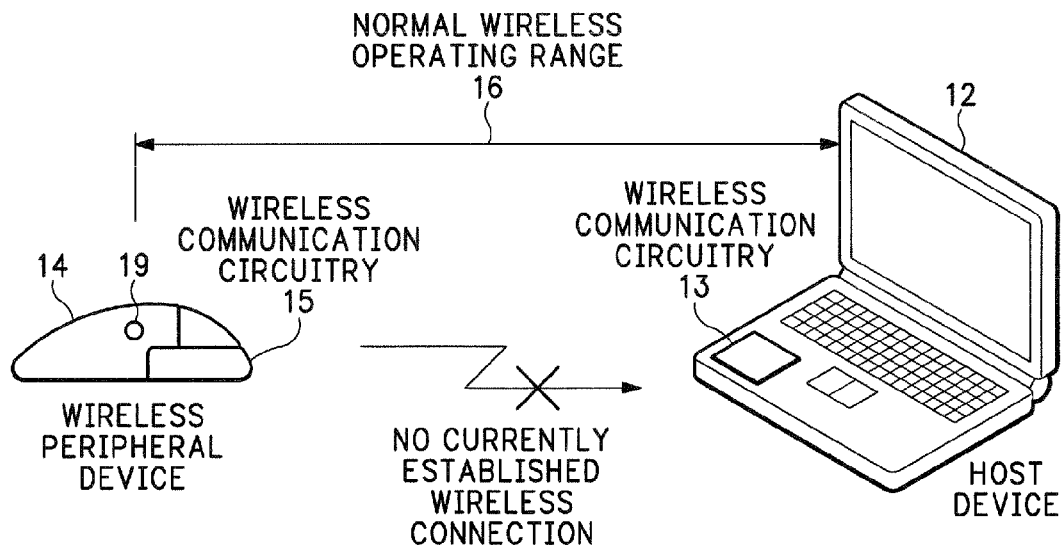
FIG. 1 is a diagram showing two wireless devices switching from a normal wireless operating range to a reduced binding range.
Figure 1:
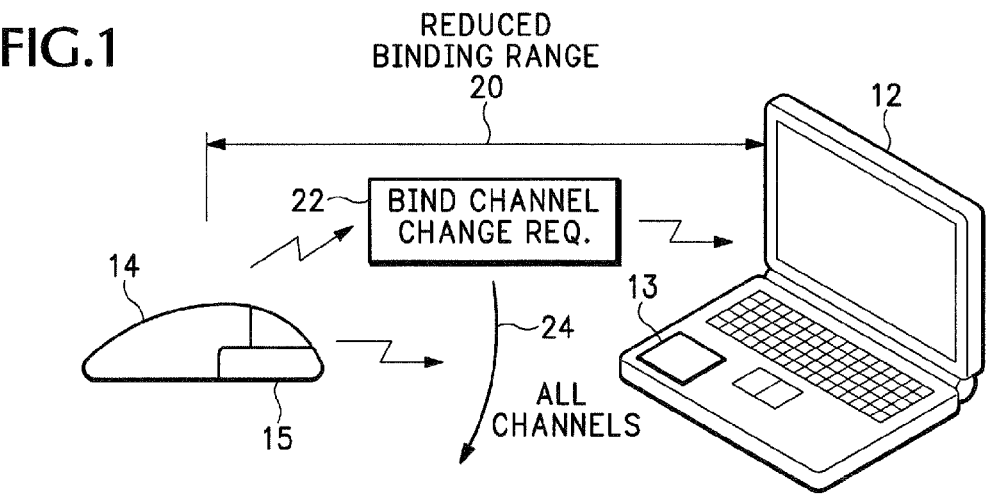

FIG. 1 shows a host device 12 that in this example is a Personal Computer (PC) and a peripheral device 14 that in this example is a computer mouse. These of course are just examples and the host device 12 and the peripheral device 14 can be any devices that need to wirelessly communicate with each other. For example, the wireless peripheral device 14 can be a game console, toy, keyboard, wireless sensors, etc. that needs to communicate with a computer, television, stereo, server, or other type of host computing device 12.

The peripheral device 14 includes wireless communication circuitry 15 that is used to wirelessly communicate with wireless communication circuitry 13 in host device 12. The wireless communication circuitry 13 and 15 is described in more detail below in FIG. 6 but can be any type of wireless communication circuitry, such as the type used for Bluetooth, IEEE 802.11, or for any other type of wireless communications.

The peripheral device 14 and the host device 12 conduct normal data and message communications over what is referred to as a normal wireless operating range 16. The normal wireless operating range 16 refers to the range of distances that the host device 12 and peripheral device 14 are normally spaced apart when conducting wireless communications. The normal wireless operating range 16 also refers to the wireless signal amplification levels or power levels normally used in the wireless devices 12 and 14 when conducting normal data and message communications.

When the peripheral device 14 is not currently wirelessly connected to the host device 12, or has never been wirelessly connected to the host device 12, the peripheral device 14 automatically reduces its normal operating range 16 to a reduced binding mode range 20. In other embodiments, the peripheral device 14 may switch to the reduced binding mode range 20 whenever it first powers up or whenever it does not currently know the wireless identification number of host device 12. Alternatively, the peripheral device 14 may switch to the reduced binding range 20 when a button 19 is pressed by a user.

The reduced binding range 20 refers to a reduced narrower range of distances that the peripheral device 14 must be physically located next to the host device 12 in order to conduct wireless communications. In one example, the peripheral device 14 switches to the reduced binding range 20 by reducing the amplification level of signals transmitted from the wireless communication circuitry 15.

While in the reduced binding range 20, the peripheral device 14 sends a bind channel change request message 22 on all channels 24 requesting any in-range host device to enter a pairing or binding mode. All channels 24 include any channels that host device 12 may be currently operating on. Because the peripheral device 14 is transmitting at a low power level, the bind channel change request 22 can only be successfully processed by a host device 12 that is in relatively close proximity to peripheral device 14. Thus, a binding handshake exchange can be initiated simply by a user moving the peripheral device 14 close to the desired host device 12.

In one example, the reduced binding range 20 may be somewhere around 6-12 inches or in other words around 15-30 centimeters. Reducing the communication range 20 to inches, reduces the possibility that the peripheral device 14 may unintentionally pair with the wrong host device.

In one example, the host device 12 successfully receiving the bind channel change request message 22 may also reduce the transmit power level and/or receive sensitivity of communication circuitry 13. This is done in one embodiment by reducing the amplification level of the transmit and/or receive signals in the wireless communication circuitry 13.

The host device 12 and the peripheral device 14 then each enter a pairing or binding mode where each configure their wireless communication circuitry 13 and 15, respectively, to operate on a particular bind channel. In one example, this may be a predetermined channel only used for binding operations. For example, in current spread spectrum wireless systems, this could be channel 78 while channels 0-77 are used for normal communications. Of course any predefined channel can be used. In an alternative embodiment, the bind channel change request 22 can identify the bind channel that the two devices 12 and 14 should use for conducting binding operations.

The bind channel change request 22 notifies the host device 12 to change to the bind mode. In addition to operating at a reduced binding range 20, wirelessly sending the bind channel change request 22 is also new. In previous binding systems, a binding button had to be pressed in order to initiate binding operations in the host computer.

Figure 2:
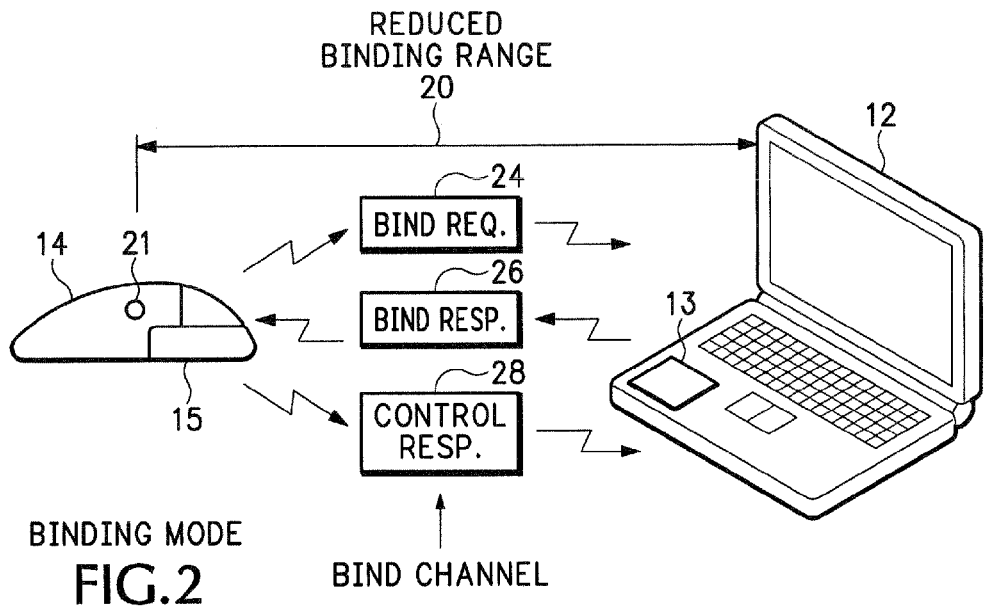
FIG. 2 is a diagram showing the wireless devices conducting binding operations while operating in the reduced binding range.

FIG. 2 shows the operations that are performed by the peripheral device 14 and the host device 12 while in the binding mode and while operating in the reduced binding range 20. In the binding mode, the peripheral device 14 and host device 12 send conventional binding messages 24, 26, and 28, but at a greatly reduced range that can only be successfully received by another wireless device in relatively close proximity.

Bind request 24 causes the host device 12 to send back a bind response 26 that identifies a wireless channel for conducting normal wireless communications. The response 26 also includes an identifier that is used by the peripheral device 14 to identify wireless communications from host device 12. The peripheral device 14 then sends a final control response 28 back to the host device 12 that acknowledges the previous bind response 26 and causes both the peripheral device 14 and the host device 12 to revert back to a normal operating mode.

A Light Emitting Diode (LED) 21 may then be activated on the peripheral or host device 14 to notify the user that the binding operations were successfully completed.

Figure 3:
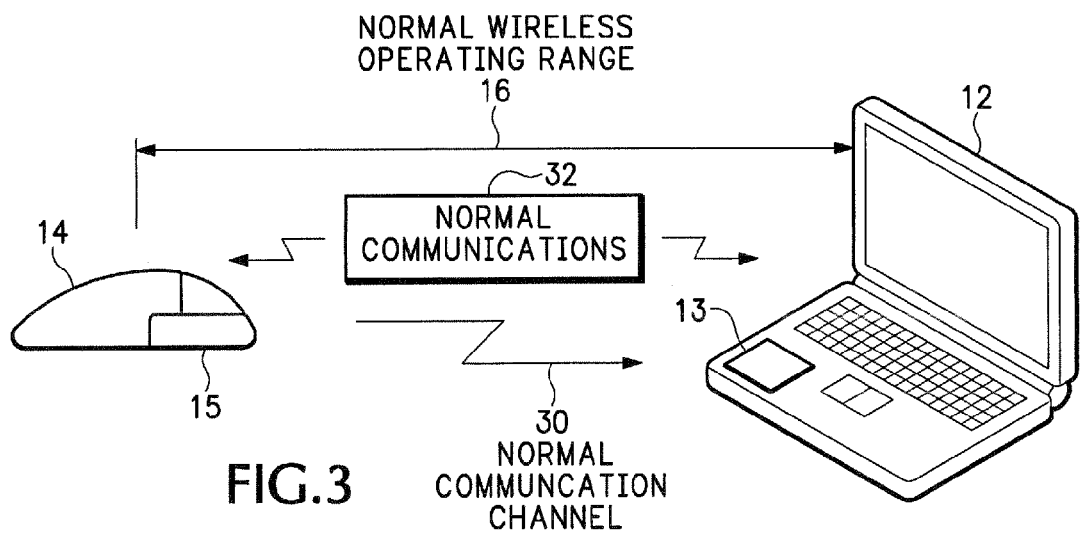
FIG. 3 is a diagram showing the two wireless devices switching back to the normal operating range.

FIG. 3 shows the peripheral device 14 and host device 12 after they have switched back to the normal wireless operating range 16. The peripheral device 14 and the host device 12 each switch their communication circuitry 15 and 13 to operate on the channel 30 identified during the binding session in FIG. 2. The communication circuitry 13 and 15 increase their transmit and receive signal strengths back to normal operational power levels. This allows wireless communications 32 at the normal wireless operating range 16.

Figure 4:
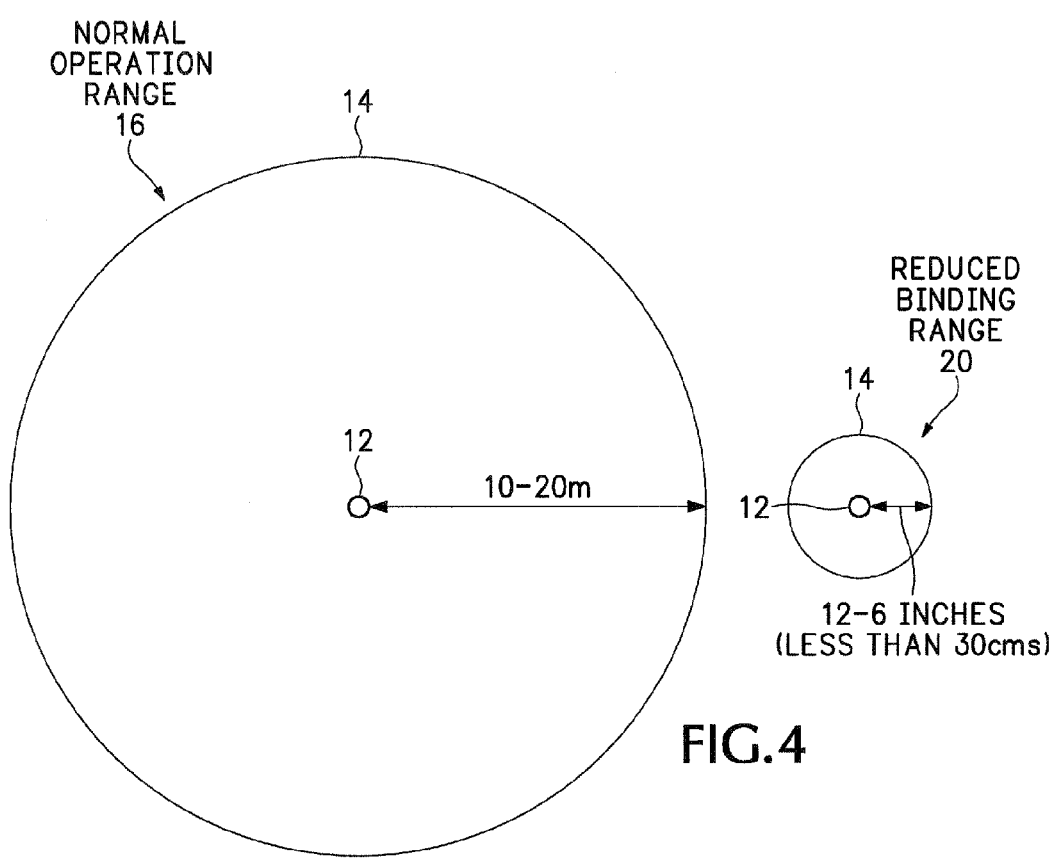
FIG. 4 shows a diagram comparing one example of the normal operating range with the reduced binding range.

FIG. 4 shows a diagram of the normal operating range 16 that is used for normal communications between the peripheral 14 and the host device 12. In one example, when both the peripheral device 14 and the host device 12 operate at normal transmit and receive signal strengths, the normal wireless operating range 16 is around 10-20 meters. In one example, when the transmit or receive signal strengths are reduced in the peripheral device 14 and the host device 12, the reduced binding range 20 is somewhere around, or less than, 6-12 inches or equivalently around, or less than, 15-30 centimeters (cms). These are only examples of the different operating ranges 16 and 20. The normal transmit or received signal strengths and the corresponding amount of signal strength reduction can be varied according to the desired operating parameters of the wireless system.

There is less likelihood that other wireless devices will mistakenly respond to the binding messages when the wireless devices operate in the reduced binding range 20. This allows a user to pair two wireless devices simply by moving the two devices close together. This is a more intuitive method for pairing a peripheral device with a host device, is more user-friendly, and results in lower cost.

Figure 5:
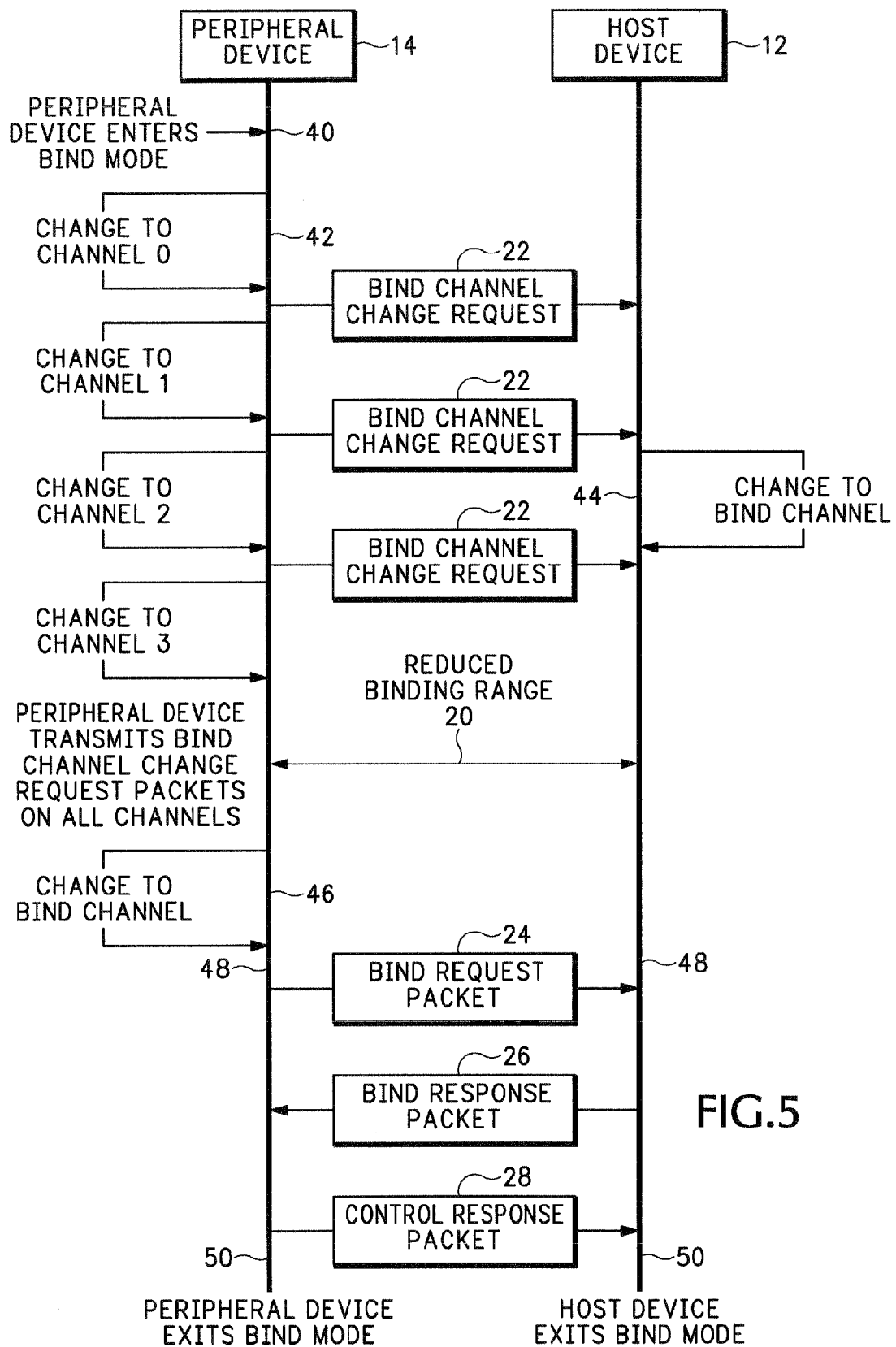
FIG. 5 is a sequence diagram showing the operations performed by the wireless devices.

FIG. 5 is a sequence diagram describing in further detail the operations performed by the peripheral device 14 and the host device 12 while in the reduced binding range 20. At stage 40 the peripheral device 14 enters the bind mode. As explained above, at initial power up, the peripheral device may not have a host device ID or operating channel configured for sending wireless communications. Alternatively, a current wireless configuration may no longer be operational. For example, the peripheral device 14 may not receive some number of responses back from the host device 12 over the currently configured communication channel. If any of these events happen, the peripheral device reduces its communications range as shown in FIGS. 1 and 2.

At stage 42, the peripheral device 14 sends out the bind channel change request packet 22 on each channel that the host device 12 might possibly be operating on. At stage 44, the host device 12 receives the bind channel change request packet 22 on one of the channels and accordingly changes its wireless communication circuitry 13 (FIG. 1) to start transmitting and receiving messages on the bind channel. At stage 46, the peripheral device 14 has completed sending the bind channel change request packet 22 on each channel. The peripheral device 14 then configures its local wireless communication circuitry 15 to start transmitting and receiving messages on the bind channel.

At stage 48, the peripheral device 14 and the host device 12 exchange conventional bind mode messages as previously described in FIG. 2. The bind request packet 24 solicits a bind response 26 from host device 12. However, in a novel operation, the host device 12 checks the received signal strength associated with bind request packet 24. The host 12 may successfully receive the bind request packet 24. However, the host might not respond if the bind request packet 24 has a received signal strength below some predefined threshold. This prevents two host devices that are in close proximity from trying to bind to the same peripheral device.

If a received signal strength indication (RSSI) level is above the predefined threshold, the host device 12 sends the bind response packet 26 back to the peripheral device 14. The bind response packet 26 identifies to the peripheral device 14 the channel that is going to be used for normal communications and also provides a host device identifier value. The peripheral device 14 then provides an acknowledge and any other necessary control information back to the host device 12 in control response packet 28. At stage 50 the peripheral device 14 and host device 12 both exit the bind mode and start operating on the identified channel at the normal operating range 16 as previously shown in FIG. 3. The peripheral device 14 may also activate the LED 21 (FIG. 1).

Figure 6:
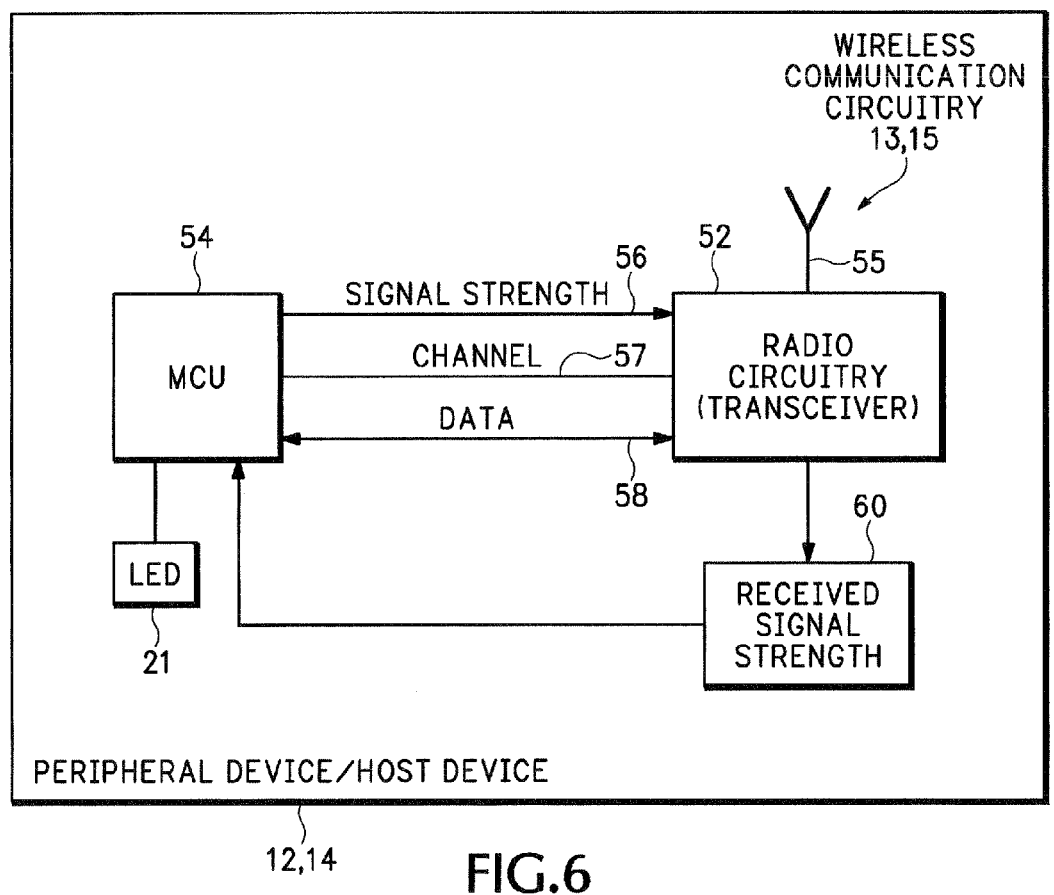
FIG. 6 is a detailed block diagram of the wireless communication circuitry inside the wireless devices.

FIG. 6 shows in more detail the wireless communication circuitry 13 or 15 operating in the host device 12 or peripheral device 14, respectively. The host device 12 and peripheral device 14 each include a micro-processor unit (MCU) 54 that controls the operation of radio circuitry 52. The radio circuitry 52 can be any conventional transceiver that transmits and receives wireless signals. The MCU 54 sends data 58 to the radio circuitry 52 that is then encoded into wireless signals and transmitted over one of the available wireless channels. Similarly, any signals received over the wireless channel by the radio circuitry 52 is decoded into digital data that is then sent to the MCU 54 for additional processing.

The MCU 54 outputs a signal strength control signal 56 that is used by the radio circuitry 52 to adjust the amplification of the transmitted and/or received wireless signals. For example, a lower value is sent on signal strength signal 56 when the MCU 54 wants the radio circuitry 52 to operate in the reduced binding range 20. Radio circuitry 52 then varies the amplification of transmit or receive signals according to signal 56. Radio circuitry 52 is known to those skilled in the art and is therefore not described in further detail.

A receive signal strength monitor 60 can be used by the host device 12 to identify a received signal strength during the binding mode operations. As described above, if the received signal strength of the bind channel change request packet 22 or the bind request packet 24 (FIG. 5) is below a predetermined threshold level, the host device 12 may ignore the received packet. This further prevents binding between the wrong wireless devices.

In one example, the radio circuitry 52 transmits wireless signals using a Bluetooth, 802.11, or some other spread spectrum transmission protocol. However it should be understood that the reduce binding range can be used with any wireless system that needs to perform binding operations.

The MCU 54 is configured to operate the same radio circuitry 52 in both the normal communications range 16 and in the reduced binding range 20. As described above, the MCU 54 automatically operates the radio circuitry 52 in the reduced binding range 20 when the radio circuitry needs to be paired with a remote wireless device and operates the radio circuitry 52 in the normal communications range when the radio circuit is successfully paired with the remote wireless device 14.

The MCU 54 changes between the different channels by varying the channel signal value 57 and controls the sending of the bind channel change request packets 22 on each of the plurality of different wireless channels. The MCU 54 also switches the radio circuitry 52 to start operating on the bind channel by setting an associated channel value 57 and performs the other operations described in FIG. 5. After binding operations have been successfully completed, the MCU 54 may activate LED 21 for some period of time.

The reduced range pairing operation does not require any additional radio circuitry or other hardware. For example, no additional buttons or near-field communications transceivers are required. A user does not have to fumble with small obscurely-placed buttons or confusing lists of hosts. Reduced range pairing is simple for a user to understand and also reduces the possibility of the peripheral pairing with the wrong host, which is more of a possibility with the button and list techniques.

Other ways to reduce the effective communication range between the peripheral device 14 and the host device 12, include bypassing the antenna 55. Additional hardware could also be used to trigger the devices 12 and 14 to enter the pairing mode. For example, a magnetic reed switch could be used as a trigger to indicate when the peripheral device 14 is held close enough to the host device 12 for conducing the bind operations. The host device 12 could include a large magnet that activates the magnetic reed switch when the two devices are within binding range.

Figure 7:
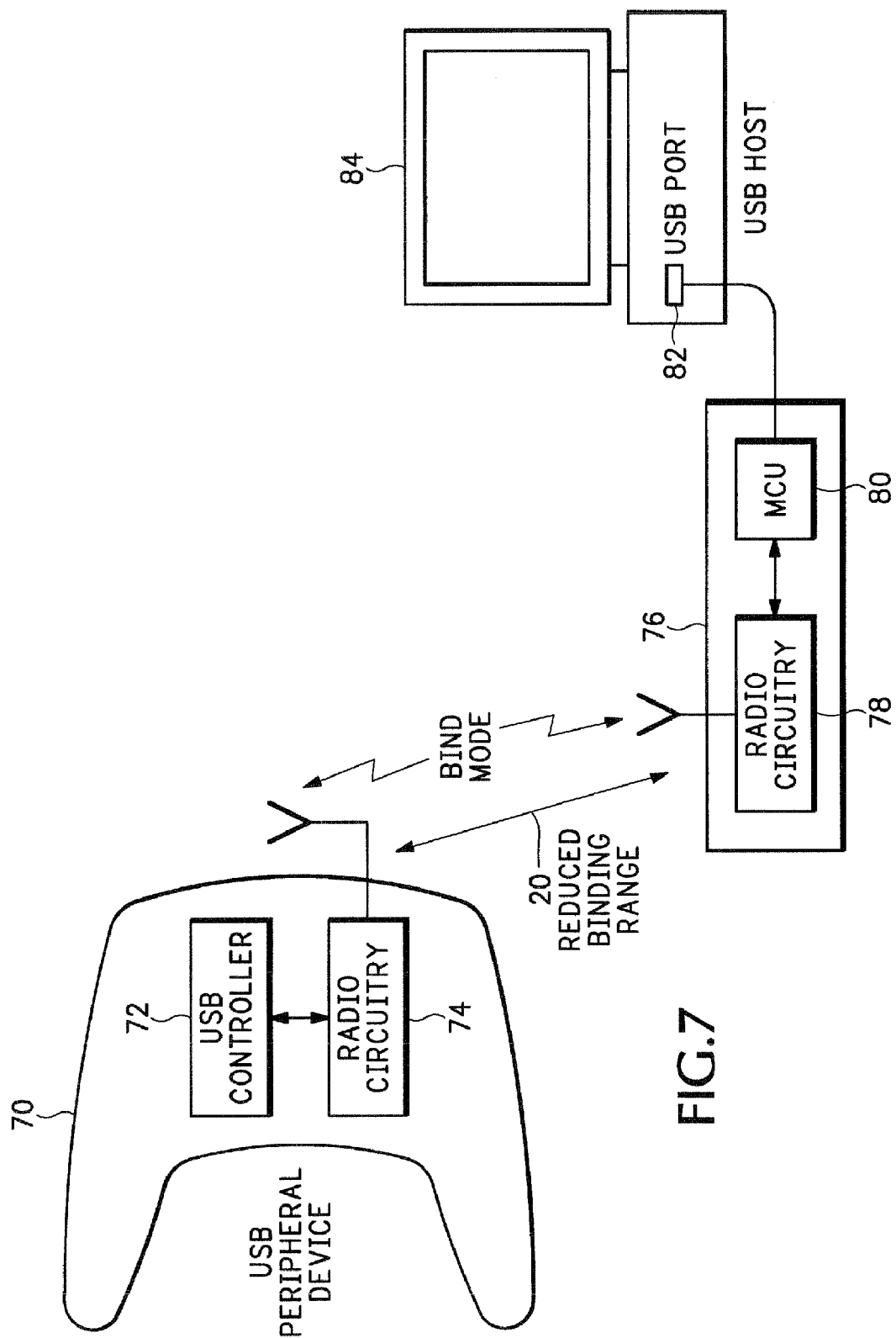
FIG. 7 is a diagram of a wireless Universal Serial Bus (USB) device that uses the reduced binding range to bind with a USB host.

FIG. 7 shows another embodiment where the reduced binding range 20 is used when a Universal Serial Bus (USB) device 70 needs to bind to a USB host 84. In this example, the USB device 70 is a wireless game controller. The game controller includes a USB controller 72 for sending or receiving USB messages. A radio circuit 74 converts the USB messages into radio signals that are transmitted to a wireless dongle 76. The dongle 76 includes radio circuitry 78 that is controlled by a MCU 80. The MCU connects to a USB port 82 on a host computer 84. The radio circuitry 74 and 78 and the processors 72 and 80 operate in a manner similar to the radio circuitry 52 and MCU 54 in FIG. 6.

The commands generated by the game controller 70 are converted by the USB controller 72 into USB messages that are transmitted via radio circuitry 74 and 78 to the MCU 80. The MCU 80 then sends the USB messages over USB port 82 to the USB host computer 84. During a binding operation, a user simply places the game controller 70 within some minimum distance from dongle 76. The two controllers 72 and 80 then automatically reduce their operating range and conduct the binding operations described above. The user can then move the game controller 70 back to some conventional wireless operating distance and start performing normal wireless game controller operations.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A method, comprising:
   detecting whether a radio circuit of a wireless device can communicate with another wireless device in a normal wireless operating range while in a normal mode, wherein said detecting comprises at least one of the following:
      automatically determining without user intervention when the radio circuit is not wirelessly connected to the other wireless device; and
      automatically determining without user intervention when the radio circuit does not know an identification number of the other wireless device;
   if the radio circuit cannot communicate with the other wireless device in the normal mode, automatically switching the radio circuit to communicate in a binding mode using a reduced wireless operating range to bind the wireless device to the other wireless device; and
   after binding the wireless devices, automatically switching the radio circuit to communicate in the normal mode using the normal wireless operating range.

2. The method of claim 1, further comprising communicating with the other wireless device in the binding mode using the reduced wireless operating range to bind the wireless devices, wherein said communicating in the binding mode allows the wireless devices to be binded when the other wireless device is physically located at a closer proximity to the wireless device than when operating in the normal wireless operating range.

3. The method of claim 2, wherein said communicating in the binding mode prevents the wireless device from binding with a third wireless device that is physically located outside of the reduced wireless operating range.

4. The method of claim 3, wherein the third wireless device is physically located outside of the reduced binding range, but inside the normal wireless operating range.

5. The method of claim 2, wherein said communicating in the binding range comprises:
   sending a bind channel change request to the other wireless device;
   receiving a bind response from the other wireless device;
   sending an acknowledge response to the other wireless device to bind the wireless devices; and
   after sending the acknowledge response, communicating with the other wireless device in the normal mode using the normal wireless operating range.

6. The method of claim 5, wherein said sending the bind channel change request comprises automatically sending the bind channel change request on each of a plurality of wireless channels after automatically switching the radio circuit to the binding mode.

7. The method of claim 5, wherein the bind response comprises at least one of information to identify a channel used by the other wireless device for communication using the normal wireless operating range and a device identifier of the other wireless device.

8. The method of claim 1, wherein said automatically switching the radio circuit to communicate in the binding mode comprises automatically reducing an amplification level of signals transmitted or received by the radio circuit in the binding mode.

9. The method of claim 1, wherein said automatically switching the radio circuit to communicate in the normal mode comprises automatically increasing the amplification level of signals transmitted or received by the radio circuit in the normal mode.

10. The method of claim 1, further comprising automatically determining when the radio circuit is binded with the other wireless device.

11. The method of claim 2, further comprising communicating with the other wireless device in the normal mode using the normal wireless operating range.

12. The method of claim 11, wherein said communicated in the normal mode allows the wireless devices to communicate when the other wireless device is physically located at a farther proximity to the wireless device than when operating in the reduced wireless operating range.

13. The method of claim 11, wherein said detecting whether the radio circuit can communicate with another wireless device in the normal mode comprises automatically determining without user intervention when response signals from the other wireless device are unsuccessfully received by the radio circuit while operating in the normal mode.

14. An apparatus, comprising:
   a radio circuit to operate in a normal mode using a normal wireless operating range and in a binding mode using a reduced wireless operating range; and
   a processor coupled to the radio circuit to detect whether the radio circuit can communicate with another wireless device in the normal wireless operating range while in the normal mode, wherein the processor is configured to detect that the radio circuit cannot communicate with the other wireless device by at least one of automatically determining without user intervention when the radio circuit is not wirelessly connected to the other wireless device and automatically determining without user intervention when the radio circuit does not know an identification number of the other wireless device, wherein, if the radio circuit cannot communicate with the other wireless device in the normal mode, the processor is configured to automatically switch the radio circuit to communicate in the binding mode using the reduced wireless operating range to bind the wireless device to the other wireless device, and wherein, after binding the wireless devices, the processor is configured to automatically switch the radio circuit to communicate in the normal mode using the normal wireless operating range.

15. The apparatus of claim 14, wherein the processor is further configured to automatically send a bind channel change request to the other wireless device, receive a bind response from the other wireless device, send an acknowledge response to the other wireless device to bind the wireless devices, and after sending the acknowledge response, communicate with the other wireless device in the normal mode using the normal wireless operating range.

16. The apparatus of claim 14, wherein the processor is further configured to receive a bind channel change request from the other wireless device, wherein the processor, in response to receiving the bind channel change request, switches to a bind channel identified in the bind channel request to communicate with the other wireless device in the binding mode using the reduced wireless operating range.

17. The apparatus of claim 14, wherein the processor is further configured to reduce an amplification level of signals transmitted or received by the radio circuit in the binding mode and increase the amplification level of signals transmitted or received by the radio circuit in the normal mode.

18. A method, comprising:
   automatically determining without user intervention that a wireless device does not know an identification number of another wireless device when the wireless device needs to be paired with the other wireless device, wherein the wireless device comprises a radio circuit configured to operate in a normal mode using a normal wireless operating range and a pairing mode using a reduced wireless operating range;

when the wireless device need to be paired with the other wireless device, automatically switching the radio circuit from the normal mode to the pairing mode from operating in a normal mode to operate in a pairing mode, wherein the radio circuit uses a normal wireless operating range when in the normal mode and a reduced wireless operating range when in the pairing mode;

automatically initiating a pairing operation with the other wireless device in the pairing mode after switching the radio circuit to the pairing mode; and after paring the wireless devices, automatically switching the radio circuit to communicate in the normal mode using the normal wireless operating range.

19. The method of claim 18, further comprising:

communicating with the other wireless device in the pairing mode using the reduced wireless operating range to pair the wireless devices, wherein said communicating in the pairing mode allows the wireless devices to be paired when the other wireless device is physically located at a closer proximity to the wireless device than when operating in the normal wireless operating range; and communicating with the other wireless device in the normal mode using the normal wireless operating range, wherein said communicated in the normal mode allows the wireless devices to communicate when the other wireless device is physically located at a farther proximity to the wireless device than when operating in the reduced wireless operating range.

* * * * *